US011546257B1

(12) United States Patent
Gupta et al.

(10) Patent No.: US 11,546,257 B1
(45) Date of Patent: Jan. 3, 2023

(54) SCALABLE SD-WAN TOPOLOGY AND ROUTE AUTOMATION

(71) Applicant: Hewlett Packard Enterprise Development LP, Houston, TX (US)

(72) Inventors: Dilip Gupta, Santa Clara, CA (US); Harish Magganmane, Santa Clara, CA (US); Stephen Su, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/400,878

(22) Filed: Aug. 12, 2021

(51) Int. Cl.
*H04L 45/64* (2022.01)
*H04L 45/12* (2022.01)
*H04L 12/46* (2006.01)

(52) U.S. Cl.
CPC ............. *H04L 45/64* (2013.01); *H04L 45/12* (2013.01); *H04L 12/4641* (2013.01)

(58) Field of Classification Search
None
See application file for complete search history.

(56) References Cited

U.S. PATENT DOCUMENTS

| 10,484,513 | B2 | 11/2019 | King et al. |
| 10,826,775 | B1 | 11/2020 | Moreno et al. |
| 2018/0343146 | A1 | 11/2018 | Dunbar et al. |
| 2019/0036813 | A1* | 1/2019 | Shenoy ............... H04L 41/5019 |
| 2019/0334866 | A1 | 10/2019 | Theogaraj et al. |
| 2020/0076683 | A1 | 3/2020 | Hegde et al. |
| 2020/0213199 | A1 | 7/2020 | Sethi et al. |
| 2020/0274772 | A1 | 8/2020 | A et al. |
| 2020/0287976 | A1 | 9/2020 | Theogaraj et al. |
| 2020/0322262 | A1 | 10/2020 | Maino et al. |
| 2021/0112034 | A1* | 4/2021 | Sundararajan ........ H04L 47/726 |
| 2021/0369309 | A1* | 12/2021 | Olofsson ............... A61B 17/86 |

FOREIGN PATENT DOCUMENTS

WO WO-20200254777 12/2020

\* cited by examiner

*Primary Examiner* — Christine T Duong
(74) *Attorney, Agent, or Firm* — Hewlett Packard Enterprise Patent Department

(57) ABSTRACT

An example network infrastructure device of a software defined wide area network (SD-WAN) comprises processing circuitry and a memory including instructions that cause the network infrastructure device to advertise a set of SD-WAN overlay tunnels terminating at the network infrastructure device, receive a network connectivity graph including a categorized set of network infrastructure devices that are members of an advertisement area and links between the set of network infrastructure devices, receive data traffic intended for a destination device of the set of network infrastructure devices, determine, based on the network connectivity graph, a preferred path to the destination device, and transmit the data traffic via an interface associated with the preferred path.

20 Claims, 5 Drawing Sheets

SCALABLE SD-WAN TOPOLOGY AND ROUTE AUTOMATION

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites to form the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and head-end gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway controls certain aspects of routing for their respective LAN, but a network orchestrator controls the overall switching and routing across the WAN via an overlay network.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1A:
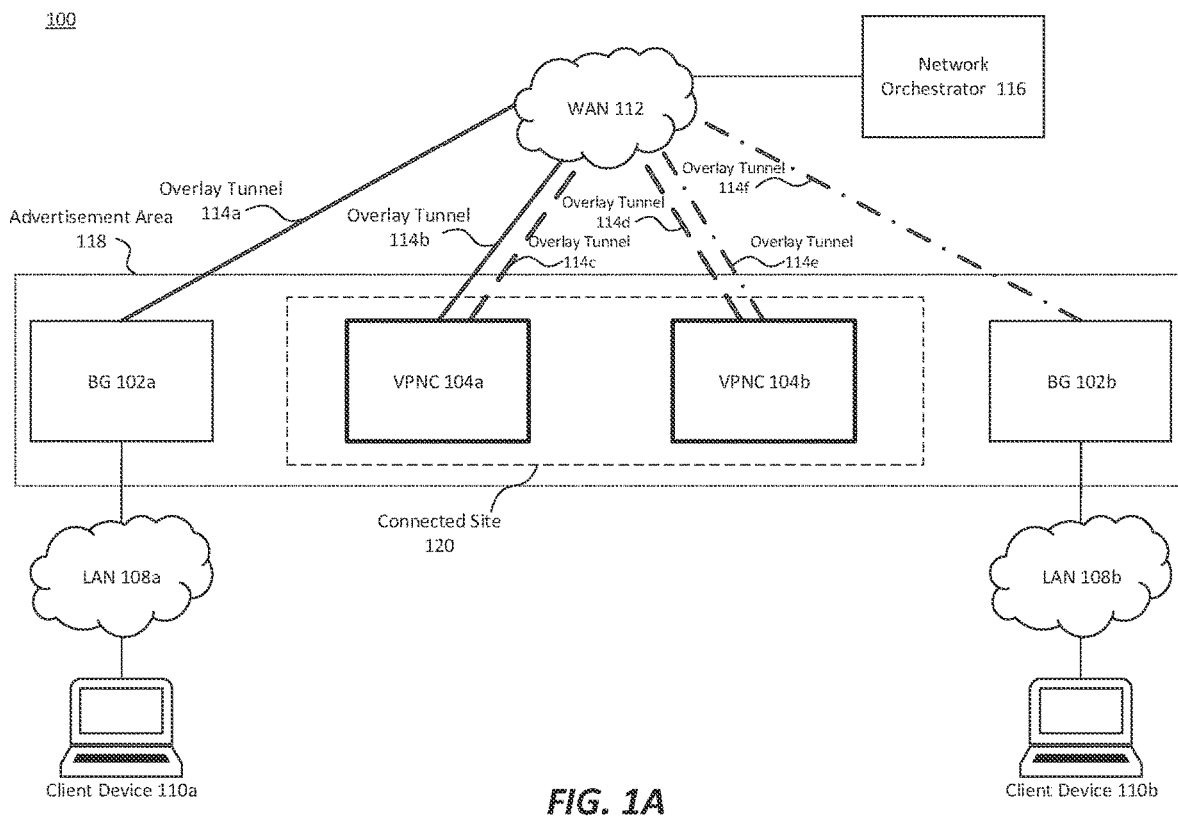
FIG. 1A is an illustration of an example SD-WAN topology focused on a single advertisement area.

Certain examples have features that are in addition to or in lieu of the features illustrated in the above-referenced figures. Certain labels may be omitted from certain figures for the sake of clarity.

DETAILED DESCRIPTION

SD-WANs are often either highly manually configured or have relatively simplistic design rules (e.g. hub and spoke, full mesh), or a combination thereof. This paradigm has been accepted by small and medium sized businesses that have a limited number of network sites and a limited number of network services. Enterprises with large IT staffs have also accepted this paradigm because they are capable of devoting large time and effort to manually configuring a large network. However, reducing the level of manual effort required to set up and maintain a large-scale SD-WAN is a particularly effective way to reduce IT costs for an organization.

One of the largest hurdles to reducing the manual effort of configuring a large SD-WAN is that the commonly used routing methods (e.g. BGP, OSPF, proprietary alternatives) can only scale to a few thousand devices before routing tables grow beyond the capabilities of some network infrastructure devices, network convergence takes minutes rather than milliseconds, and overhead from routing advertisements flooding the network start to consume a substantial portion of the network's bandwidth. As a result, SD-WAN providers institute a cap on the number of overlay aware network infrastructure devices that can be simultaneously provisioned on a particular SD-WAN.

A particular genre of enterprises suffer most acutely from this limitation, although all customers may benefit from improved handling of topology and routing. Particularly, enterprises with a small number of large corporate offices and a large number of small (often customer-facing) establishments struggle to manage the myriad devices used to establish the SD-WAN. The IT staff is often geographically concentrated and the IT issues are often geographically dispersed. In such networks, thousands to tens of thousands of sites make network management using current methods functionally impossible. Any workarounds that exist have their own limitations and shortcomings, making any solution a combination of tradeoffs to balance network features with the scale of the network.

In an example consistent with this disclosure, a network orchestrator receives routing advertisements from all of the branch gateways (BGs) and VPN concentrators (VPNCs) in the SD-WAN. From the routing advertisements, the network orchestrator is able to determine the status, type, and termination points of all overlay tunnels in the SD-WAN. With that information, the network orchestrator can then automatically partition the SD-WAN into advertisement areas. Advertisement areas are regions of the SD-WAN that are substantially interconnected but are not substantially connected to other advertisement areas. For example, an advertisement area may include overlay tunnels between member devices that allows for routing of data traffic from any member device to any other member device, but the advertisement area may not include overlay tunnels to any devices outside of the advertisement area. In another example, there may be some overlay tunnels to devices outside of the advertisement area, but those tunnels may be low capacity, rarely used, configured as standby, or otherwise having characteristics such that they are not considered a substantial connection. Likewise, certain member devices of an advertisement area may not be interconnected via an overlay tunnel, but the member devices may be categorized as members of the advertisement area because of other characteristics of the device or the network.

The network orchestrator also partitions the VPNCs into connected sites. Connected sites are logical sites that are portions of and/or multiples of physical sites that are treated in aggregate because they are intended to share network services. For example, a network administrator may configure settings in the network orchestrator dashboard to treat a first datacenter and a second datacenter as connected. The network orchestrator than translates that intent (first and second datacenters are connected) into the action of adding VPNCs of the first and second datacenters to a connected site representing the combined first and second datacenters.

With the network partitioned into advertisement areas and connected sites, the network orchestrator can generate a series of network connectivity graphs, one graph for each advertisement area. The network orchestrator then provides the VPNCs and BGs with the appropriate network connectivity graph given their advertisement area memberships. BGs, generally being less computationally powerful, may receive a network connectivity graph including a route list including next overlay hops for each route. VPNCs, generally being more computationally powerful and often each being connected to many BGs, are better suited to compute their own routes, thus the route list provided with the network connectivity graph from the network orchestrator includes a destination device of each respective route, and the VPNC calculates preferred paths for each route based on the network connectivity graph. For example, VPNC may used Dijkstra's algorithm to determine a least cost path to the destination device using overlay tunnels.

This solution is a "best of both worlds" combination of the benefits of centralized topology management and distributed computing. Resultantly, this solution allows the network to scale without unacceptable performance degradation. In one example implementation consistent with this disclosure, a network with over 16,000 overlay enabled network infrastructure devices was improved from a 33 minute network convergence time to 125 milliseconds. Not only do the features of this disclosure improve the speed at which a network is ready after setup or a topology change, but they also reduce the amount of manual effort required to manage a large number of SD-WAN devices, and allow for more complicated deployment topologies (e.g. Hub Mesh) to be more fully automated.

FIG. 1A is an illustration of an example SD-WAN topology focused on a single advertisement area. While FIG. 1A may represent the entirety of SD-WAN 100, FIG. 1A may represent a partial view of SD-WAN 100 that is solely focused on a single advertisement area or a portion of a single advertisement area of SD-WAN 100. For the purposes of clarity, not all devices and not all connections are shown in FIG. 1A. As can be appreciated by a person having ordinary skill in the art, the features taught via the simplified illustration in FIG. 1A can also apply to SD-WANs 100 of different sizes, complexities, and topologies.

SD-WAN 100 includes network interface devices 102 and 104. Network interface devices 102 and 104 include two categories of devices, branch gateways (BG) 102 and virtual private network concentrators (VPNC) 104. In some examples, BGs 102a and 102b are computationally less powerful devices deployed in branch offices, home offices, and retail stores, and VPNCs 104a and 104b are computationally more powerful devices deployed in core sites, such as headquarters and datacenters. BG 102a is coupled to client device 110a via LAN 108a. LAN 108a may be a simple as an Ethernet cable coupling BG 102a to client device 110a or as complex as a multi-tier network for a large branch office campus. Likewise, BG 102b is coupled to client device 110b via LAN 108b. VPNCs 104a and 104b may also be coupled to respective LANs, but such LANs are outside the scope of this disclosure.

The network infrastructure devices 102 and 104 are connected to WAN 112 via uplinks (not shown). The uplinks may be wired or wireless, public or private, and are parts of the underlay network of SD-WAN 100. Network orchestrator 116 is also connected to WAN 112, and each network infrastructure device 102 and 104 connects (not shown) to network orchestrator 116. Since SD-WAN 100 is not guaranteed to be entirely made of private connections, and some data may be transmitted across the public Internet, overlay tunnels 114 are used, among other reasons, to simplify routing and increase security.

VPNCs 104 and BGs 102 periodically advertise the tunnels that they terminate to network orchestrator 116. Network orchestrator 116, upon receiving the advertisements, stitches the advertisements together to obtain a more holistic view of the topology. For example, network orchestrator 116 may pair tunnel advertisements which are identified with the same UUID by the respective termination devices. Network orchestrator 116 may also receive additional information in the advertisements from the network infrastructure devices, such as a tunnel type (e.g. MPLS, INET, LTE), tunnel operational status (e.g. up, down), tunnel capacity (e.g. 100 Mbps), and other characteristics. Network orchestrator 116 may also group tunnels whose termination devices are the same, treating them as alternate links between the two devices. In some examples, network orchestrator 116 may aggregate all tunnels between a pair of devices together and treat them as one logical link. Network orchestrator 116 determines link costs for each link and associates those costs with the links. Network orchestrator 116 may use intents (not shown) provided by a network administrator to set the costs for links in order to ensure that data traffic is flowing between desired devices using desired links.

For example, network orchestrator 116 identifies that overlay tunnel 114a advertised by BG 102a is the same tunnel as overlay tunnel 114b advertised by VPNC 104a. Using this information, network orchestrator 116 determines that there is a tunnel between BG 102a and VPNC 104a. If, for example, both BG 102a and VPNC 104a advertise their tunnels using a common UUID of "102a104a", network orchestrator 116 can pair the two advertisements to recognize the single tunnel. Similarly, network orchestrator 116 would recognize overlay tunnels 114c and 114d as a tunnel connecting VPNC 104a to VPNC 104b and overlay tunnels 114e and 114f as a tunnel connecting VPNC 104b to BG 102b.

Network administrator intents may include an intent to conform SD-WAN 100 to a certain topology (e.g. a Hub Mesh topology), intent to aggregate certain network sites together into a logical network site, intent to split certain networks apart into separate network sites, intents for certain VPNCs 104 to be primary in sites where multiple VPNCs 104 operate redundantly, and other intents for general operation and topology of SD-WAN 100.

Network orchestrator 116 then uses the link information and the network administrator intents to construct a network connectivity map. Network orchestrator 116 then analyzes the network connectivity map for overlay interconnectivity. Network orchestrator 116 groups devices into advertisement areas based on the overlay interconnectivity of the devices within each advertisement area 118. For example, network interface devices 102 and 104 within a particular advertisement area 118 may be substantially interconnected to one another and network interface devices in different advertisement areas may not be substantially connected.

Upon partitioning SD-WAN 100 into advertisement areas, network orchestrator 116 creates network connectivity graphs for each advertisement area 118. In some examples, network connectivity graphs may be portions of the network connectivity map. In certain examples, network connectivity graphs are link state databases. In other examples, network connectivity graphs are modified link state databases that include additional characteristics about the nodes or the links, and/or include additional modifications such as splitting links into pairs of directional links, not all of which may be advertised. For example, a link (not shown) between a VPNC 104b and a BG 102a may only be advertised in the direction of VPNC 104b to BG 102a so that BG 102a does not use VPNC 104b as a transit link for traffic from LAN 108a, but other devices on SD-WAN 100 can access devices on LAN 108a via the VPNC 104b to BG 102a link.

Network orchestrator 116 then transmits ("advertises") the network connectivity graphs to the network infrastructure devices 102 and 104. In the particular example of FIG. 1A, network orchestrator 116 transmits the network connectivity graph for advertisement area 118 to BG 102a, BG 102b, VPNC 104a, and VPNC 104b. However, the network connectivity graph is not transmitted to devices on LANs 108, as those LAN-side devices are not managed as part of the SD-WAN. It is possible, through technologies such as SD-Branch, for LAN-side devices to be managed in the same way as SD-WAN devices, and the same features of this disclosure would apply to LAN-side SD-Branch devices. In some examples, network connectivity graphs are only transmitted to VPNCs 104, and BGs 102 do not receive network connectivity graphs. As described in more detail below, BGs 102 may receive fully computed routing tables from network orchestrator 116, thus obviating the need for a network connectivity graph. This serves two purposes. First, each BG 102 usually has relatively few (on the order of 10 or less) overlay tunnels connecting to VPNCs 104, so the time required for network orchestrator 116 to compute routing tables for a large volume of BGs 102 is still rather low. Second, since BGs usually have low computational power, relying on each BG 102 to compute their own routing tables may overtax their CPU, memory, or other capacity. Conversely, VPNCs 104 are much more well suited to computing their own routing tables. First, each VPNC 104 usually has many (on the order of hundreds or thousands) overlay tunnels, so the time required for network orchestrator 116 to compute routing table for the relatively small volume of VPNCs 104 is rather high. Second, since VPNCs usually have higher computational power, relying on each VPNC 104 to compute their own routing tables is not likely to overtax their computational resources, and the benefit of distributing the compute workload can reduce the overall time for network convergence.

Network orchestrator 116 also creates connected sites, such as connected site 120. Using information from the network connectivity map along with network administrator intents, such as an intent to connect a pair of data centers, network orchestrator 116 partitions VPNCs into connected sites. In certain examples, connected sites are created to include all VPNCs interconnected together by overlay links. In some examples, every VPNC 104 is made a member of a connected site, even when the connected site is merely a wrapper for the VPNC. In some other examples, connected sites are created only when VPNCs in separate network sites are intended to operate collectively or when multiple VPNCs in a single network site are intended to operate individually. In FIG. 1A, VPNC 104a and VPNC 104b are both members of connected site 120. In some examples, VPNC 104a and VPNC 104b are located in a first datacenter and a second datacenter, respectively, and a network administrator has provided an intent that the first datacenter and the second datacenter be treated collectively. A VPNC 104a can be a member of any number of connected sites, but for the purposes of clarity, this disclosure shows and describes connected sites that are disjoint sets. As would be clear to a person having ordinary skill in the art, the features of this disclosure also apply to overlapping connected sites.

Network orchestrator 116 also advertises routes for SD-WAN 100. Like with the network connectivity graphs, the routes advertised are limited in scope to reduce the load on the network infrastructure devices 102 and 104, as well as reduce the computational load on network orchestrator 116. The routes advertised to a particular network infrastructure device 102 or 104 are limited to routes within the device's corresponding advertisement area 118. Further, the routes advertised to VPNCs 104 that are members of a connected site 120 may not include routes to VPNCs that are members of a different connected site. Resultantly, each BG 102 in advertisement area 118 receives information to populate a precomputed next-hop route table for all BGs 102 and VPNCs 104 of advertisement area 118 from network orchestrator 116, but each VPNC 104 in advertisement area 118 only receives destination device information for routes to each BG 102 and next hop routes to VPNCs 104 in the same connected site 120. For example, VPNC 104a would not be provided a next hop route to a VPNC (not shown) in a different connected site, but still in advertisement area 118. Continuing the example, VPNC 104a would be provided a destination device route for a BG (not shown) connected only (in the overlay) to the VPNC in the different connected site, but VPNC 104a would compute a route to the BG based on the network connectivity graph.

When BG 102a receives a request to forward data traffic from client device 110a to client device 110b, BG 102a then looks up identifying information of client device 110b (e.g. IP address) in a routing table that was populated based on the routing advertisement from network orchestrator 116. The request to forward data traffic may be, among other things, a request to form a session between client device 110a and client device 110b, an ARP request, or any other appropriate data unit used to initiate communication between client devices 110. The routing table includes a next overlay hop field, which corresponds to VPNC 104a (via overlay tunnel 114a). BG 102a then forwards the request to VPNC 104a. In the example illustrated in FIG. 1A, VPNC 104a, upon receiving the request, looks up client device 110b and finds a next overlay hop field corresponding to VPNC 104b. This is because VPNC 104a and VPNC 104b are in the same connected site 120, and routes are advertised between VPNCs of the same connected site. In another example where VPNC 104a and VPNC 104b are in different connected sites, VPNC 104a only obtains an overlay destination device (BG 102b) from the routing table and determines that BG 102b is not directly reachable via any interface of VPNC 104a. VPNC 104a then computes a route using a path computation algorithm, such as Dijkstra's algorithm, to determine a preferred path to BG 102b (e.g. next overlay hop to VPNC 104b via overlay tunnel 114c). VPNC 104b, upon receiving the request, looks up the route in the routing table and finds a direct connection to BG 102b via overlay tunnel 114e, and forwards the request accordingly. VPNC 104b, being the overlay destination device for the route, then forwards the request across LAN 108b to client device 110b.

Figure 1B:
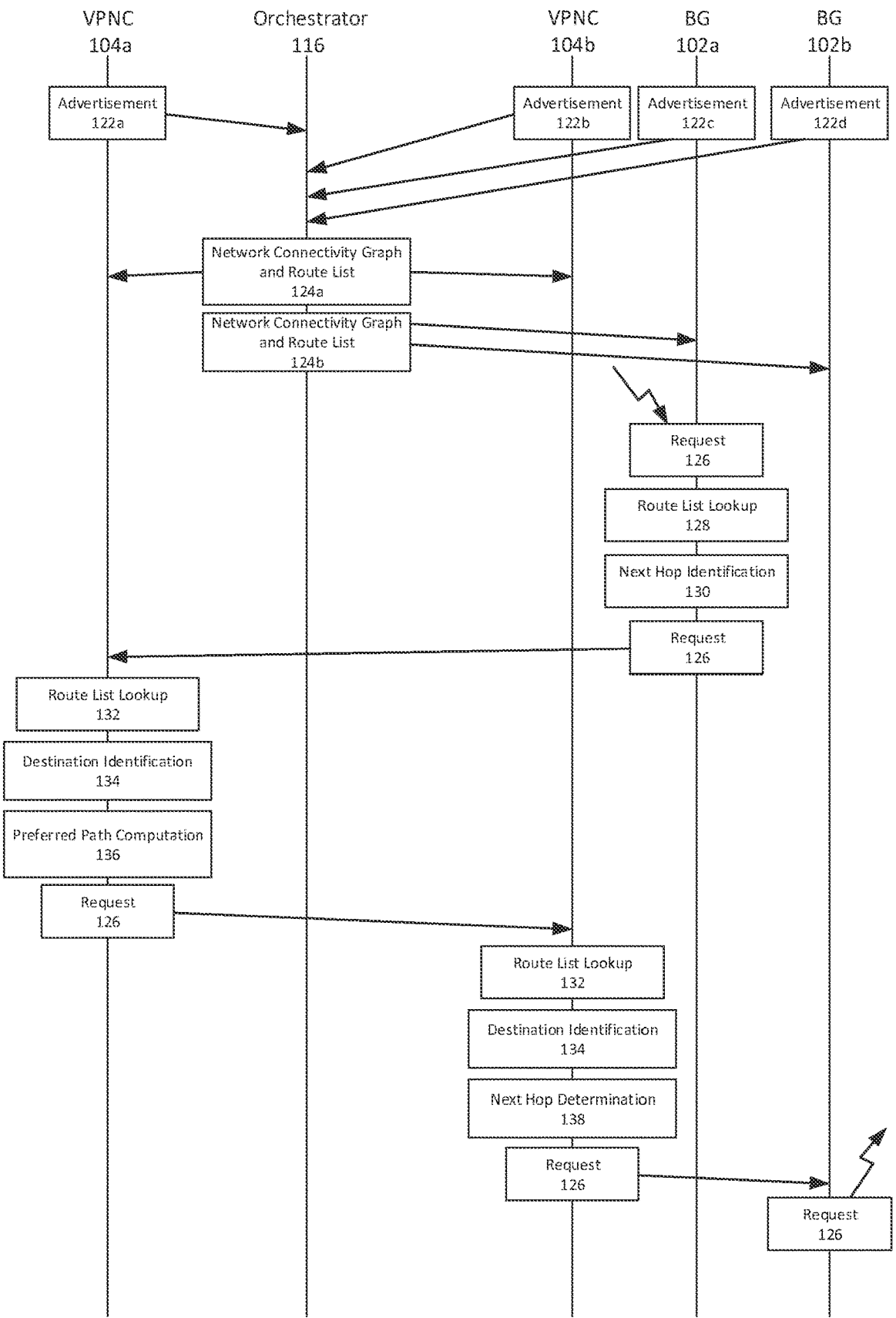
FIG. 1B is a dataflow diagram illustrating the operation of the example SD-WAN topology of FIG. 1A.

FIG. 1B illustrates, in more detail, an example dataflow across SD-WAN 100. While the dataflow in shown in a certain order in FIG. 1B, it is contemplated that the dataflow can happen in different orders or different configurations depending on characteristics of the SD-WAN 100 or various devices.

Over some period of time, advertisements 122 are transmitted from network infrastructure devices 102 and 104 to network orchestrator 116. Advertisements 122 may be typical route advertisements that are forwarded to network orchestrator 116 rather than being flooded across the network. In some examples, Advertisements 122 may be modified to include additional or different information beyond that which is typically included in a route advertisement. For example, advertisements 122 may include a listing IP subnets reachable via the advertising device, a listing of overlay tunnels terminating at the advertising device, and additional information relating to the overlay tunnels, such as a tunnel ID, tunnel type, and tunnel status. While FIG. 1B illustrates a single advertisement 122 being sent from each device, multiple advertisements 122 may be sent from each device, partitioned by subject matter (e.g. IP subnets in one advertisement and overlay tunnels in another). Multiple advertisements 122 may be sent from each device over time as the network changes, the updated advertisements 122 reflecting the changes in the network. Advertisements 122 may be sent periodically from the devices.

Upon receiving advertisements 122, network orchestrator 116 constructions a network connectivity map. The network connectivity map may include all regions of SD-WAN 100, including many different advertisement areas. The network connectivity map may represent a graph data structure, connecting nodes (e.g. overlay enabled network infrastructure devices) via links (e.g. overlay links). Link costs may be set on various links of the network connectivity map to incorporate routing preferences, capture link capabilities (e.g. link type, link operational status, link termination points), and otherwise reflect the characteristics and preferences of SD-WAN 100 in the network connectivity map. From the network connectivity map, network orchestrator 116 derives network connectivity graphs for each advertisement area. Network orchestrator 116 may also use information included in the network connectivity map, along with information received from advertisements 122 sent from the network infrastructure devices 102 and 104 to generate route lists for each network infrastructure device of the advertisement area 118. In some examples, advertisements 122 are a single advertisement from each network infrastructure device 102 or 104 including tunnel information and route information. In some other examples, multiple advertisements 122 are sent from each network infrastructure device 102 or 104, one or more including tunnel information and one or more including route information.

Route lists that network orchestrator 116 generate may vary by intended network infrastructure device 102 or 104 and by whether the device is a branch gateway or a VPNC. For example, route lists for branch gateways 102 may include routes to all other branch gateways 102 of the advertisement area 118 as well as to all accessible VPNCs 104 of the advertisement area 118. Route lists for VPNCs 104, on the other hand, may only include routes to BGs 102 in the advertisement area 118 and to other VPNCs 104 in the connected site 120. In certain examples, route lists for BGs 102 may include a next overlay hop parameter specifying through which overlay tunnel to send traffic destined for an address in the subnet of the related route, whereas route lists for VPNCs 104 may include a final overlay destination parameter specifying a final overlay device to which the traffic destined for an address in the subnet of the related route should arrive for final underlay routing. In such examples, VPNCs 104 may take different actions than BGs 102 to forward traffic based on the information provided in each respective type of route list.

Network orchestrator 116, sends the network connectivity graphs and route lists 124 to the network infrastructure devices 102 and 104. As described above, network connectivity graph and route list 124a sent to VPNCs 104a and 104b may be characteristically different than network connectivity graph and route list 104b sent to BGs 102a and 102b. While the network connectivity graphs are being shown coupled with route lists, the graphs and the lists may be sent together, sent separately, or even combined into a single data structure in certain examples. As mentioned above, each network connectivity graph and route list sent to each device may be different from one another. For example, network connectivity graph and route list 124a sent to VPNC 104a may be different from network connectivity graph and route list 124a sent to VPNC 104b. As an example of why this is the case, VPNC 104b does not need overlay routes to client devices attached to itself. Such routes are terminated at VPNC 104b, and overlay routing does not apply. However, VPNC 104a needs to know about overlay routes that terminate at VPNC 104b in order to route relevant traffic toward VPNC 104b.

Although no additional activity is shown in FIG. 1B between network orchestrator 116 transmitting network connectivity graphs and route lists 124 and BG 102a receiving request 126, additional actions may occur within the network. For example, network infrastructure devices 102 and 104 may integrate the network connectivity graphs and route lists into their internal data structures, VPNCs 104 may pre-compute next hops for some routes, and updated advertisements 122 may be sent from network infrastructure devices 102 and 104 to network orchestrator 116.

Request 126 is received at BG 102a from a client device 110a attached via LAN 108a. Request 126 may be a request to initiate a connection from client device 110a to another "final destination" device on SD-WAN 100, such as client device 110b. In response to receiving request 126, BG 102a looks up 128 the final destination device by IP address in the route list (e.g. routing table including the information provided in route list 124b) to determine which route applies. Often, route lists do not list individual IP addresses, but specify routes by subnet or even aggregate multiple subnets together when the next hop is the same. BG 102a may employ various techniques to match the IP address to a particular route in the route list. From the identified route associated with request 126, BG 102a identifies 130 a next overlay hop (e.g. VPNC 104a) to route request 126 to client device 110b. As previously mentioned, in some examples, network orchestrator 116 has precomputed the next overlay hop for each route in the route list sent to BG 102a. Upon identifying 130 the next overlay hop, BG 102a may need to determine a particular link or interface by which to reach the next overlay hop. For example, information from network connectivity graph 124b may indicate that next overlay hop VPNC 104a is reachable via overlay tunnel 114f, which terminates at BG 102a.

BG 102a transmits request 126 across overlay tunnel 114f to VPNC 104a. VPNC 104a engages in a similar process to BG 102a, but somewhat different. VPNC 104a first looks up 132 the final destination device's IP address in the route list. VPNC 104a then identifies 134 an overlay destination device. Note that "final destination device" refers in this disclosure to the client device 110b that will receive request 126, whereas the "overlay destination device" (or "destination device") is the final overlay hop before any further routing of request 126 is done via underlay. The overlay destination device to client device 110a is BG 102b, which is not directly coupled via an overlay tunnel 114 with VPNC 104a. This results in an inability for VPNC 104a to select an interface to forward request 126 through. Instead, VPNC 104a computes a preferred route 136 using the received network connectivity graph 124a. In some examples, VPNC 104a may use a route computation algorithm such as Dijkstra's algorithm to determine a least cost route from VPNC 104a to BG 102b. As previously mentioned, network connectivity graph 124a has link costs embedded within the graph to ensure proper routing of traffic according to network administrator intent even though routes are computed individually by each VPNC 104. VPNCs 104 may pre-compute their routes when processing power is available for such a task in order to improve the latency in forwarding request 126, but the specifics of such pre-computation by VPNCs are beyond the scope of this disclosure. In examples where BGs 102 are sent pre-computed route lists from network orchestrator 116 and VPNCs 104 are not sent pre-computed route lists, the types of network infrastructure device are treated differently for a few different purposes. In large networks, which are contemplated as receiving disproportionate benefit from the features of this disclosure, network topologies like Hub Mesh result in each BG 102 having relatively few overlay connections (e.g. 2) and each VPNC 104 having relatively many overlay connections (e.g. 10,000). The computational complexity of computing routes for a large number of devices (BGs 102), each with a small number connections is relatively low, and is thus amenable to being done by network orchestrator 116. Furthermore, many BGs 102 are computationally limited devices that may not be able to compute routes as quickly as network orchestrator 116. Alternatively, computing routes for even a small number of devices (VPNCs 104) can be prohibitively complex for a single network orchestrator 116 when each of those devices has a relatively large number of overlay connections. Rather than spend a large amount of time (sometimes many minutes) pre-computing paths for all VPNCs 104, network orchestrator 116 provides enough information for VPNCs 104 to compute or pre-compute their own paths. Since VPNCs 104 tend to be computationally powerful devices, any loss in computation speed on an individual route is counterbalanced by more immediate (sometimes milliseconds) network convergence.

VPNC 104a identifies VPNC 104b as the next hop based on the computed 136 preferred path and forwards request 126 to VPNC 104b via overlay tunnel 114c.

VPNC 104b operates similarly to VPNC 104a but with some key differences. Note that VPNC 104b is the next-to-last hop in the overlay path, and that there is a direct overlay interface between VPNC 104b and BG 102b (the overlay destination device). Similar to VPNC 104a, VPNC 104b looks up 132 the route in the route list corresponding to the final destination device identified in request 126. Similar to VPNC 104a, VPNC 104b identifies 134 an overlay destination device (BG 102b) for request 126. However, unlike VPNC 104a, VPNC 104b determines 138 that the next overlay hop device is the same as the overlay destination device, which is BG 102b. There is a direct overlay link between VPNC 104b and BG 102b, so path computation is not required. VPNC 104b forwards request 126 to BG 102b. In some examples, path computation may still occur when there is a direct overlay link between the forwarding device and the overlay destination device, such as when multiple overlay links connect the two devices.

Upon receiving request 126, BG 102b routes to client device 110b via underlay network LAN 108b. Specific details of the underlay routing are outside of the scope of this disclosure.

While FIG. 1A illustrates a unidirectional flow of data traffic, it is understood that connections are usually bidirectional. As can be appreciated, the return path for traffic from client device 110b to client device 110a could possibly take a different path through the overlay than the initial path followed by request 126. However, network orchestrator 116 may be configured to avoid this behavior (known as fish tailing) and to ensure the return path is "pinned" to the request route by adjusting link costs in the network connectivity graphs. Pinning the return path can prevent network security apparatus improperly blocking data traffic along the return path due to the data traffic taking an unexpected path.

It can be appreciated that SD-WAN 100 is not required to be an entirely on-premises network. Depending on specific network topology any device could be implemented as a cloud device or cloud service. For example, the network orchestrator 116 can be offered as a cloud service and client device 110b could be a cloud device deployed on a public or private cloud ecosystem.

Figure 2:
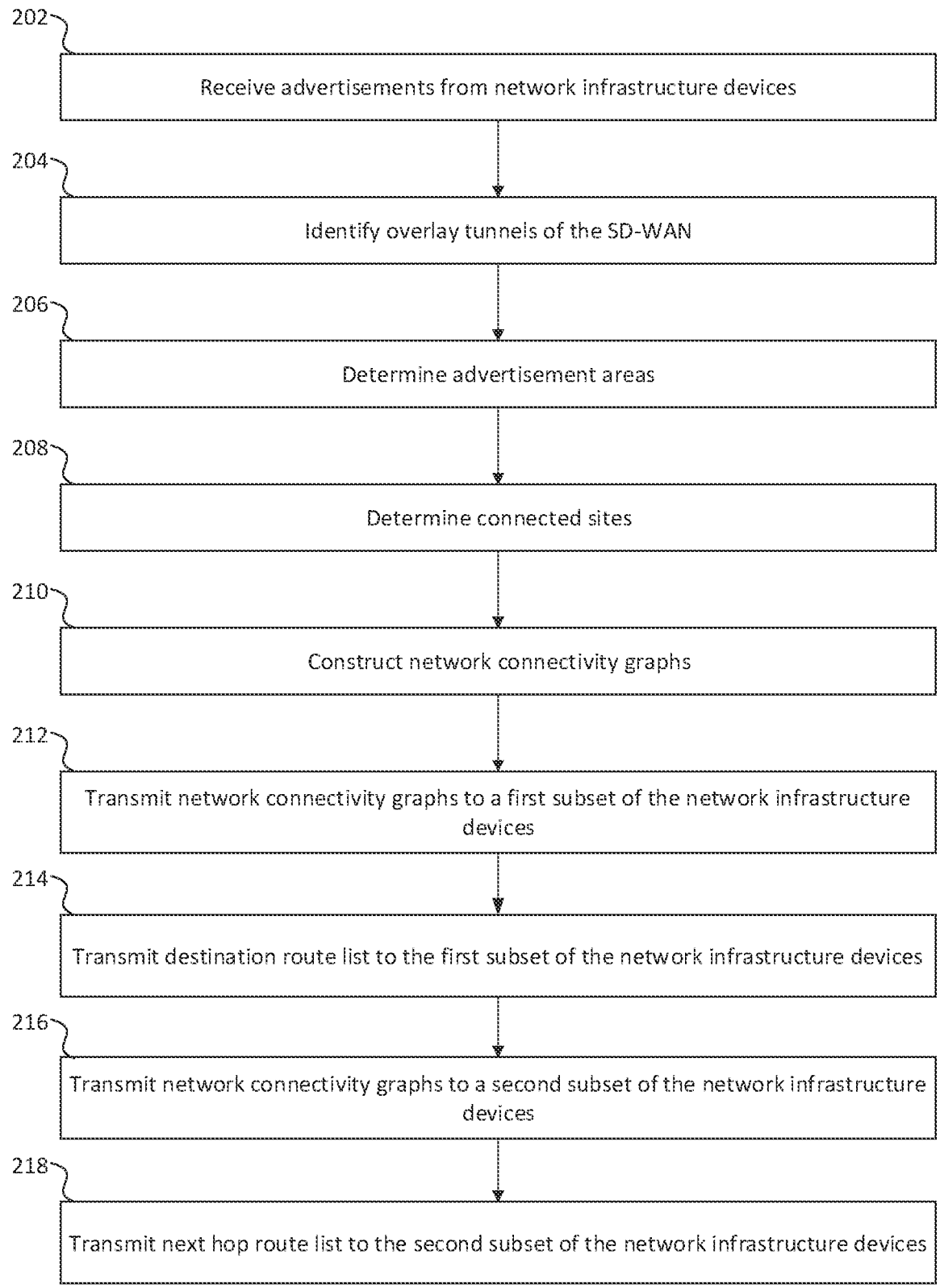
FIG. 2 is a flowchart illustrating an example method for configuring a SD-WAN topology.

FIG. 2 is a flowchart illustrating an example method for configuring a SD-WAN topology. Method 200 may be stored as instructions in a non-transitory, computer readable medium and executed on processing circuitry of a device, such as a network orchestrator.

In block 202, advertisements are received from a set of network infrastructure devices of a software defined wide area network (SD-WAN), each advertisement including information about SD-WAN overlay tunnels terminated at the respective network infrastructure device. In some examples, different information is received in a series of advertisements from each network infrastructure device. For example, tunnel information from each network infrastructure device may be received in a first advertisement and route information from each network infrastructure device may be received in a second advertisement. In certain examples, advertisements are updated and/or renewed on a periodic basis or when an update to the network makes prior advertisements no longer accurate. The network orchestrator may transmit a request for advertisements in some examples and in other examples the advertisements may be proffered by the network infrastructure devices without a request from the network orchestrator.

In block 204, overlay tunnels of the SD-WAN are identified, including type, operational status, and termination points, based in part on the received advertisements. In some examples, the received advertisements include a universally unique identifier (UUID) of each advertised tunnel, and tunnels advertised by each terminating network infrastructure device are identified as a single tunnel based on matching UUIDs. In some other examples, other characteristics advertised to network orchestrator are used to identify the overlay tunnels.

In block 206, a set of advertisement areas of the SD-WAN are determined based in part on the identified overlay tunnels. In determining the set of advertisement areas, each of the set of network infrastructure devices is categorized as a member of an advertisement area. In some examples, the advertisement area is a collection of network infrastructure devices between which SD-WAN overlay tunnels interconnect to form a contiguous SD-WAN overlay network. In certain examples, this collection of network infrastructure devices includes BGs and VPNCs. In some examples, each advertisement area is substantially interconnected by overlay tunnels but is not substantially connected to other advertisement areas by overlay tunnels.

In block 208, a set of connected sites is determined, based in part on the identified overlay tunnels. In some examples, each of a subset of the set of network devices are categorized into at least one of the set of connected sites. In certain examples, each of the set of connected sites is a collection of network infrastructure devices that operate collectively based on an intent provided by a network administrator. The intern provided by the network administrator may include an intent to connect network sites to which one or more of the set of network infrastructure devices are associated. In some examples, the subset of network infrastructure devices are VPNCs and the network infrastructure devices that are in the set but not in the subset are BGs. Connected sites may be used to group interconnected VPNCs to limit the size of routing tables in each VPNC to only include routes that are reachable by that particular VPNC. Due to the types of topologies used in large networks, such as Hub Mesh, BGs may not have substantially large routing tables since BGs have relatively few overlay connections and are able to aggregate subnets in their routing tables reduce the number of entries in the tables.

In block 210, a set of network connectivity graphs are constructed based in part on the identified overlay tunnels, the set of advertisement areas, and the set of connected sites. In some examples, each of the network connectivity graphs are associated with a respective advertisement area of the set of advertisement areas. In some examples, wherein the set of network connectivity graphs provide information about overlay tunnel connectivity between network infrastructure devices of a SD-WAN.

In some examples, a first set of route lists is constructed. Each route list of the first set indicates a destination device for each route from a particular network infrastructure device. In some examples, each route list of the first set corresponds to a respective VPNC of the SD-WAN. The destination device may be a final overlay device to reach the final destination device, and the final overlay device may separately route data traffic to the final destination device via underlay links.

In some examples, a second set of route lists is constructed. Each route list of the second set indicates a next hop device for each route from a particular network infrastructure device. In some examples, each route list of the second set corresponds to a respective BG of the SD-WAN. The next hop device may be a next hop overlay device connected to the respective BG via a network overlay tunnel.

In some examples, the network connectivity graphs include routes that indicate which network infrastructure device to forward data traffic associated with the respective route. In some other examples, routes are created separately from the network connectivity graphs and routes may include either a next overlay hop or an overlay destination device depending on which network infrastructure device will receive the particular route. In some examples, the network orchestrator generates a network connectivity map that includes the overlay devices and links of the SD-WAN along with link costs and other relevant information. From the network connectivity map, the network connectivity graphs and route lists can be constructed per advertisement area and per recipient network infrastructure device.

In block 212, network connectivity graphs are transmitted to a first subset of the network infrastructure devices. The network connectivity graph transmitted to each of the first subset of network infrastructure devices is the network connectivity graph associated with the advertisement area to which the respective network infrastructure device is a member. In some examples, the first subset of network infrastructure devices are VPNCs.

In block 214, the first set of route lists is transmitted to each respective network infrastructure device. The first set of route lists is transmitted to network infrastructure devices categorized into one of the set of connected sites. In some examples, each of the first set of route lists is transmitted to a VPNC. In certain examples, each of the first set of route lists includes overlay destination devices for each route.

In block 216, network connectivity graphs are transmitted to a second subset of the network infrastructure devices. The network connectivity graph transmitted to each of the second subset of network infrastructure devices is the network connectivity graph associated with the advertisement area to which the respective network infrastructure device is a member. In some examples, the second subset of network infrastructure devices are BGs. In certain examples, the network connectivity graphs transmitted to the second subset of the network infrastructure devices are substantially the same network connectivity graphs as the network connectivity graphs transmitted to the first subset of the network infrastructure devices on a per-advertisement area basis.

In block 218, the second set of route lists is transmitted to each respective network infrastructure device. The second set of route lists is transmitted to network infrastructure devices not categorized into one of the set of connected sites, but rather to other network infrastructure devices. In some examples, each of the second set of route lists is transmitted to a BG. In certain examples, each of the second set of route lists includes next hop devices for each route.

Figure 3:
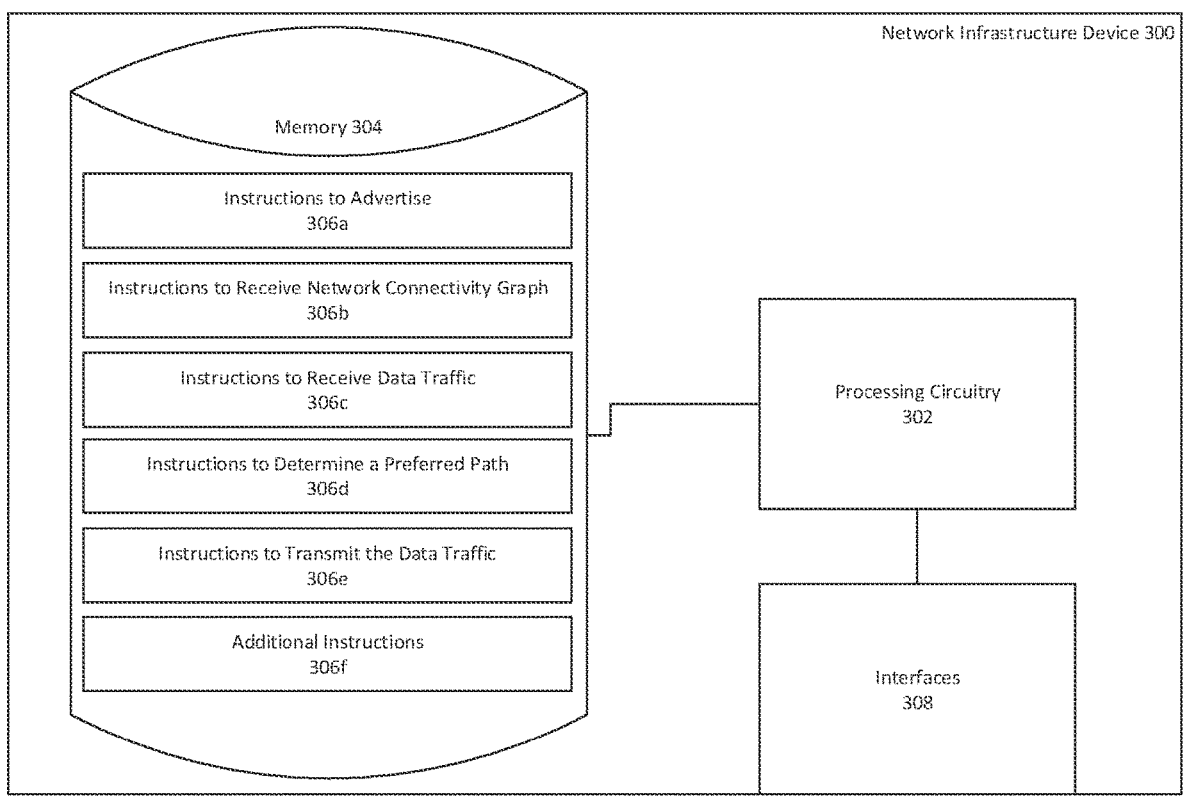
FIG. 3 is an illustration of an example network infrastructure device.

FIG. 3 is an illustration of an example network infrastructure device. Network infrastructure device 300 may be a physical device, a virtualized device, a cloud device, a cloud service, or any other computing device or combination of computing devices. Network infrastructure device 300 includes processing circuitry 302, memory 304, and interfaces 308. Memory 304 contains instructions 306, which are executed by processing circuitry to cause network infrastructure device 300 to undertake certain actions. Instructions 306 may be executed in different orders or in parallel and still achieve the features of this disclosure. Additional instructions 306*f* represent additional instructions used to achieve the features of this disclosure. As would be obvious to a person having ordinary skill in the art, even more additional instructions may exist in memory 304 to cause network infrastructure device 300 to take actions not directly achieving features of this disclosure. Such additional instructions are outside the scope of this submission. Network infrastructure device 300 may be a virtual private network concentrator (VPNC).

Instructions to advertise 306*a* cause network infrastructure device 300 to advertise to a network orchestrator a set of SD-WAN overlay tunnels terminating at network infrastructure device 300, specifically terminating at interfaces 308. The advertisement may be transmitted via an interface 308 to the network orchestrator. The advertisement may include information about the overlay tunnels terminating at network infrastructure device 300, including tunnel type, tunnel status, and a tunnel UUID. This information may be collected for a tunnel by querying a respective interface 308 associated with the tunnel. In some examples, additional information may be collected, including tunnel health parameters.

Instructions to receive network connectivity graph 306*b* cause network infrastructure device 300 to receive a network connectivity graph from the network orchestrator. The network connectivity graph includes a categorized set of network infrastructure devices that are members of an advertisement area and links between the set of network infrastructure devices. A subset of the set of network infrastructure devices are each categorized into at least one of a set of connected sites. In some examples, the advertisement area is a collection of network infrastructure devices between which SD-WAN overlay tunnels interconnect to form a contiguous SD-WAN overlay network. In certain examples, each of the set of connected sites is a collection of network infrastructure devices that operate collectively based on an intent provided by a network administrator. The intent provided by the network administrator may include an intent to connect network sites to which one or more of the set of network infrastructure devices are associated.

In some examples, additional instructions 306f include instructions to receive a route list from the network orchestrator. In some examples, each route of the route list includes an overlay destination device. The route list may include routes to destination devices connected via tunnels to the network infrastructure device, routes to destination devices that are categorized into the same connected site as the network infrastructure device, and routes to destination devices connected via tunnels to at least one device categorized into the same connected site as the network infrastructure device.

Instructions to receive data traffic 306c cause network infrastructure device 300 to receive, via an interface 308, data traffic intended for an overlay destination device of the set of network infrastructure devices. In some examples, the data traffic includes the address of a final destination device, but the final overlay device to forward the data traffic is the overlay destination device. Network infrastructure device 300 may not, at the time that the data traffic is received, know that the data traffic is intended for the overlay destination device. In some examples, network infrastructure device 300 identifies the overlay destination device by referencing the route list received from the network orchestrator.

Instructions to determine a preferred path 306d cause network infrastructure device 300 to determine a preferred path to the overlay destination device via a device categorized into the same connected site as network infrastructure device 300. For example, the overlay destination device may be a BG that is not directly connected to network interface device 300 via a tunnel that terminates at an interface 308. However, using the network connectivity graph and a route computation algorithm, network interface device 300 may determine a preferred path to the overlay destination device via a next hop device, which is categorized into the same connected site as network infrastructure device 300. An example of this situation is the topology of FIG. 1A, where a request received from a BG (BG 102a, for example) directly linked to the network infrastructure device 300 (VPNC 104a, for example) cannot be directly forwarded to the overlay destination device (BG 102b, for example), but must be forwarded via another device (VPNC 104b, for example) that is in the same connected site. Determining the preferred path may include identifying a destination device from a route list received from the network orchestrator, computing a least cost path from the network infrastructure device to the destination device based on the network connectivity graph, and selecting the least cost path as the preferred path Instructions to transmit the data traffic 306e cause network infrastructure device 300 to transmit the data traffic via an interface 308 associated with the preferred path. Referring back to the example topology of FIG. 1A, the interface 308 associated with the preferred path could correspond, for example, to overlay tunnel 114c.

Figure 4:
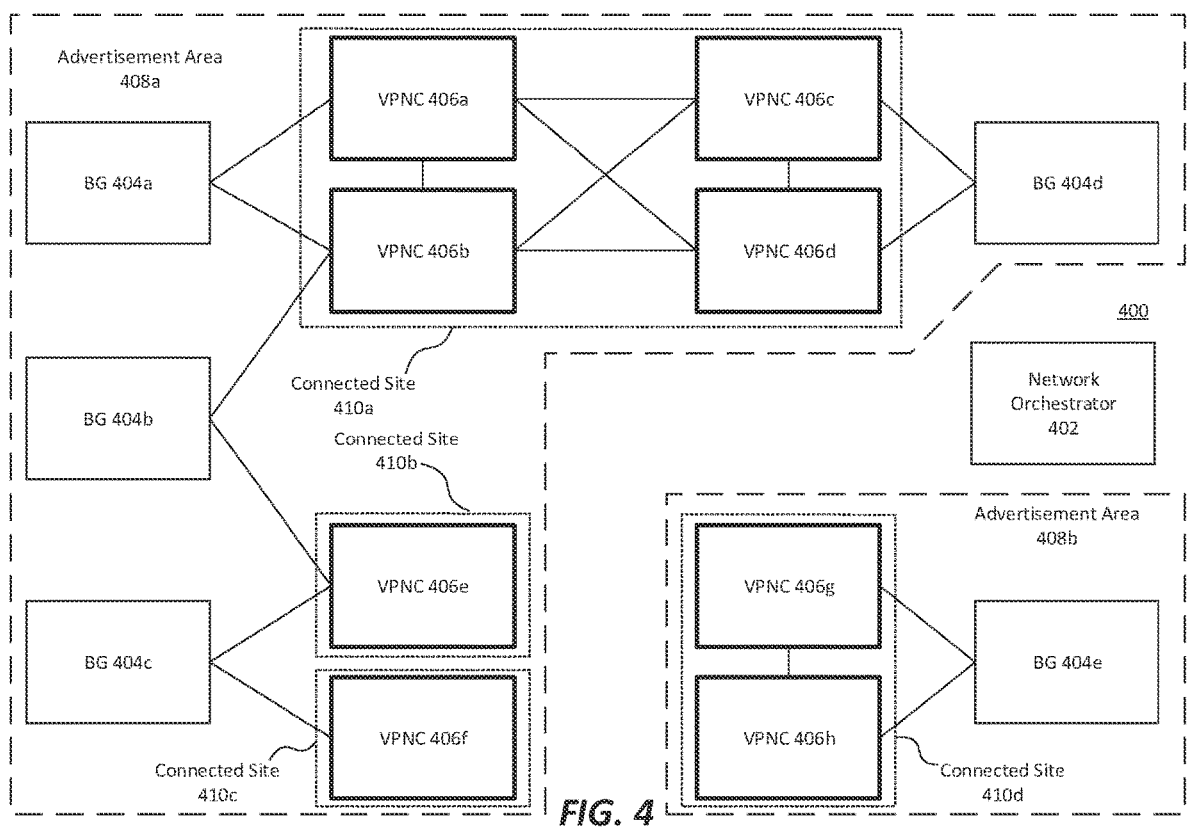
FIG. 4 in an illustration of an example SD-WAN network including multiple advertisement areas.

FIG. 4 in an illustration of an example SD-WAN network including multiple advertisement areas. FIG. 4 is a simplified illustration for the purpose of describing general operation of a SD-WAN with multiple advertisement areas. This illustration is not meant to comprehensively illustrate and describe the operation of a full SD-WAN network. SD-WAN 400 includes a network orchestrator 402, BGs 404a-e, VPNCs 406a-h, advertisement areas 408a-b, and connected sites 410a-d. For the purposes of this figure, VPNCs that are arranged vertically in close proximity (e.g. VPNC 406a and VPNC 406b) are VPNCs in the same network site. Lines between network infrastructure devices represent overlay tunnels.

While this figure is simplified, it illustrates some of the challenges of large-scale hub mesh networks. Hub mesh network have characteristics of both full mesh networks and of hub and spoke networks to avoid the scaling issues with either of those architectures. It can be appreciated that VPNCs often manage many times more tunnels and routes than BGs do in a hub mesh topology. For example, VPNC 406b manages 5 tunnels and each of the BGs manage 2 tunnels. If each BG shown in FIG. 4 instead represented 1,000 BGs, it can be appreciated how each BG would still only manage 2 tunnels, but VPNC 406b would now manage over 2,000 tunnels. This imbalance in load growth due to scaling means that VPNCs 406 should be treated differently from BGs 404.

When network orchestrator 402 collects information about the topology of SD-WAN 400 from the advertisements, orchestrator 402 is able to determine which devices are interconnected via overlay tunnels and which devices are not connected to one another. This is a basis for determining the advertisement areas 408. For example, all of the devices in advertisement area 408a are interconnected to one another via overlay tunnels, but none of the devices in advertisement area 408a are connected via overlay tunnels to any devices of advertisement area 408b. Based, in part, on those connections and lack of connections, network orchestrator 402 constructs the advertisement areas 408. In some networks, the partitioning may not be so "clean". There may be limited overlay tunnels between advertisement areas. However, thresholds and other logic may be employed to determine when such limited overlay tunnels are considered "insubstantial" and still allow partitioning of the advertisement areas. One such example would be if an inactive tunnel connected VPNC 406d to VPNC 406g for disaster recovery purposes.

Network connectivity graphs advertised by network orchestrator 402 shows all overlay aware network infrastructure devices within a respective advertisement area 408. For example, the network connectivity graph sent to VPNC 406b would contain information that, if converted into a visual form, may look substantially similar to the portion of FIG. 4 enclosed in the advertisement area 408a dashed box. Additional information, such as link costs, link types, and other characteristics of the network may be included in the network connectivity graphs, as well.

Network orchestrator 402 collects route information from advertisements from the network infrastructure devices. From this route information along with the network graphs, network orchestrator 402 constructs route lists for each BG 404 and each VPNC 406. Route lists are a listing of routes, which include subnets of IP addresses and a related overlay device. The related overlay device is different for BGs 404 and VPNCs 406. Focusing first on advertisement area 408b, the route lists are fairly simple. An example route list for BG 404e may contain information similar to the following:

| Subnet | Next Hop |
| --- | --- |
| 10.0.0.1/8 | VPNC 406g |
| 10.0.1.1/8 | VPNC 406h |
| 10.1.0.1/8 | 10.1.0.1 (local device accessible by underlay) |

Traffic with a destination IP address in the range from 10.0.0.1 to 10.0.0.255 gets sent to VPNC 406g. Traffic with a destination IP address in the range from 10.0.1.1 to 10.0.1.255 gets sent to VPNC 406h. Traffic with a destination IP address in the range from 10.1.0.1 to 10.0.0.255 gets sent to a local router 10.1.0.1, which is not shown, via underlay. In some examples, BG 404e may be the only router for its branch, and the routing table may include additional entries in the list for local devices.

There are differences when viewing the routing table of VPNC 406g. Rather than capturing the next overlay hop, the routing table includes an overlay destination device. However, since advertisement area 408b is so small, the next overlay hop for any route will most likely be the overlay destination device. However, to show the difference more clearly, the preferred path from VPNC 406g to BG 404e will be to transit through VPNC 406h. An example route list for VPNC 406g may contain information similar to the following:

| Subnet | Destination |
| --- | --- |
| 10.0.0.1/8 | 10.0.0.1 (local device accessible by underlay) |
| 10.0.1.1/8 | VPNC 406h |
| 10.1.0.1/8 | BG 404e |

Notably, since the route list includes the overlay destination device instead of the overlay next hop device, subnet 10.1.0.1/8 is still associated with BG 404e, even though the preferred path makes the next overlay hop VPNC 406h. VPNC 406g, in response to receiving traffic with a destination IP in the 10.1.0.1/8 subnet (or prior to receiving in the case of precomputed routes), determines a next hop by executing a path computation route that concludes the path from VPNC 406g→VPNC 406h→BG 404e is the least cost overlay path, the preferred path. From the preferred path, VPNC 406g knows to forward the traffic through the tunnel to VPNC 406h.

Turning to advertisement area 408a, additional differences in how BGs 404 and VPNCs 406 are treated begin to appear. For example, BGs 404 in advertisement area 408a will receive routes in the route list for all other BGs 404 in the advertisement area 408a as well as for all VPNCs 406 in advertisement area 408a. However, in some examples, VPNCs 406 only receive routes in the route list for all BGs 404 and other VPNCs 406 in the same connected site 410. As an example, VPNC 406a receives routes for devices on BGs 404a-d as well as VPNCs 406a-d. However, routes for devices on VPNCs 406e-f are not in the list for VPNC 406a. One purpose for this difference relates back to the earlier discussion about imbalance in load growth due to scaling between VPNCs and BGs. BGs, even when including routes for many subnets, can aggregate the many subnets into a few routes because there are only a few overlay connections. VPNCs, by virtue of having relatively many overlay connections, must compute many routes individually, and removing some of the unusable routes reduces the processing load on the VPNC. Notably, even though VPNC 406a to VPNC 406e, for example, is asserted to be an unusable route, there is a path between the devices. VPNC 406a→VPNC 406b→BG 404b→VPNC 406e connects the two VPNCs. However, this is an unusable route because transiting VPNC traffic across a BG (such as BG 404b) is not desirable. BGs are usually not computationally powerful enough to handle both local traffic and cross traffic between VPNCs (which are often at datacenters). When ignoring the BG 404b path, traffic from VPNC 406a is unrouteable to VPNC 406e.

VPNCs may be in a number of configurations within connected sites. A few examples are highlighted in FIG. 4. For example, VPNCs 406g and *h* are collocated, connected VPNCs that are collectively treated as connected site 410d. It is also possible to partition sites in a single network site. For example, VPNCs 406e and 406f are in the same network site, but they are not connected and they are members of connected sites 410b and 410c respectively. This may occur, for example, when two separate systems are hosted at the same site or on the same cloud service, such as a payroll system and a R&D roadmap repository. Multiple network sites can also be treated as a single connected site, as is the case with connected site 410a. the first network site (including VPNCs 406a and 406b) is interconnected with the second network site (including VPNCs 406c and 406d) and they are all members of connected site 410a. This situation may occur, for example, where two datacenters host different enterprise-wide services and are interconnected to provide the ability for services to interact.

Network convergence is a process by which network infrastructure devices acquire an understanding of the topology of a network and how to route data traffic across the network.

Underlay is the network of physical devices and links that form a network. The underlay may include network infrastructure devices, as well as interfaces of those devices, and physical interconnects such as wired and wireless connections.

Overlay is an abstracted logical network that is layered above the underlay network. The overlay in SD-WAN networks abstracts away complex underlay paths through the Internet that are outside the administrative domain of the administrators of the SD-WAN. The overlay may use overlay tunnels (encrypted VPN tunnels) to connect nodes (network infrastructure devices) of the overlay network.

Overlay tunnels are encrypted connections established between overlay aware devices of the SD-WAN. The encrypted connections may be VPN tunnels such as IPSec tunnels. Data traffic can be forwarded between the terminating devices of the tunnel without intervening devices being able to discern the contents of the traffic.

An overlay tunnel is said to terminate at a device when the tunnel connection is established at an interface of the device. The device is able to encrypt data traffic to be sent through the tunnel and decrypt data traffic received from the tunnel.

A contiguous overlay network is an overlay network where all devices are interconnected, directly or indirectly, via overlay tunnels. In some instances, certain devices of the contiguous overlay network may not be able to route traffic to other devices of the contiguous overlay network, but those limitations are not because there is not an overlay path between the devices.

A hub mesh topology is a network topology where BGs are connected to VPNCs much like in a hub and spoke model, wherein many BGs connect to a VPNC, and each BG connects to relatively few VPNCs. VPNCs (hubs) within the same connected site mesh together.

Route lists are a listing of routes suitable to be inserted into a routing table. Generally, route lists can include IP subnets and an associated device to receive data traffic for those IP subnets.

Paths are successive links and devices throughout a network used to provide data traffic from one device to another. Often, "routes" and "paths" are used as near-synonyms. In this disclosure "routes" encompass the logical end-to-end connection between devices across the SDN overlay network. "Paths" refer to a succession of physical or logical links and devices that data traffic is forwarded through in the SDN overlay network or the physical underlay network.

A network advertisement is a message transmitted from a network device to one or more other network devices presenting some information about the transmitting device that assists in operating the network.

A network connectivity graph is a graph data structure that captures characteristics of a network, including links between nodes and link costs.

Network infrastructure devices are said to operate collectively when data traffic with a destination associated with one of the network infrastructure devices can be received at any of the collectively operating network infrastructure devices and be routed to the destination.

A destination device is an overlay aware network infrastructure device that is the final overlay aware device before data traffic reaches a final destination device.

An interface is a logical and physical component of a network device that manages connections with the network.

A cloud service is an application or other executable that executes in the cloud as a service.

A cloud device is a computing device that is deployed in the cloud.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

Headend gateways (sometimes referred to as VPN concentrators) are network infrastructure devices that are placed at the edge of a core site LAN. Often headend gateways are routers that interface between the LAN and a wider network, whether it be directly to other LANs of the WAN via dedicated network links (e.g. MPLS) or to the other LANs of the WAN via the Internet through links provided by an Internet Service Provider connection. Many headend gateways can establish multiple uplinks to the WAN, both to multiple other LAN sites, and also redundant uplinks to a single other LAN site. Headend gateways also often include network controllers for the core site LAN. In such examples, a headend gateway in use in a SD-WAN may include a network controller that is logically partitioned from an included router. The network controller may control infrastructure devices of the core site LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc. The network orchestrator then transmits commands to various network infrastructure devices of the SD-WAN to alter network topology and network routing in order to achieve various network efficiency and efficacy goals.

A network administrator is a person, network service, or combination thereof that has administrative access to network infrastructure devices and configures devices to conform to a network topology.

A client device is a computing device that is operated or accessed by a network user. Client devices include laptop/desktop computers, tablets/phones/PDAs, servers, Internet of Things devices, sensors, etc.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

A software defined network (SDN) is a network overlaying a physical network that allows a device, such as a network orchestrator, to dynamically configure the topology of the SDN overlay using flows to specific routes through the underlay physical network. Dynamic configuration can include alterations to the network topology based on many factors, including network health and performance, data type, application type, quality of service restrictions (e.g. service level agreements), device load, available bandwidth, business cost, and other factors.

A software defined wide area network (SD-WAN) is a SDN that controls the interaction of various sites of a WAN. Each site may have one or more LANs, and LANs connect to one another via WAN uplinks. Some WAN uplinks are dedicated lines (e.g. MPLS), and others are shared routes through the Internet (e.g. DSL, T1, LTE, 5G, etc.). An SD-WAN dynamically configures the WAN uplinks and data traffic passing through the WAN uplinks to effectively use the resources of the WAN uplinks.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A network infrastructure device of a software defined wide area network (SD-WAN), comprising:
   processing circuitry; and
   a memory including instructions that, when executed by the processing circuitry, cause the network infrastructure device to:
   advertise, to a network orchestrator, a set of SD-WAN overlay tunnels terminating at the network infrastructure device;
   receive, from the network orchestrator, a network connectivity graph including a categorized set of network infrastructure devices that are members of an advertisement area and links between the set of network infrastructure devices, wherein a subset of the set of network infrastructure devices are each categorized into at least one of a set of connected sites;
   receive, from a client device, data traffic intended for a destination device of the set of network infrastructure devices;
   determine, based on the network connectivity graph, a preferred path to the destination device via a device categorized into the same connected site as the network infrastructure device; and
   transmit the data traffic via an interface associated with the preferred path.

2. The network infrastructure device of claim 1, wherein the advertisement area is a collection of network infrastructure devices between which SD-WAN overlay tunnels interconnect to form a contiguous SD-WAN overlay network.

3. The network infrastructure device of claim 1, wherein each of the set of connected sites is a collection of network infrastructure devices that operate collectively based on an intent provided by a network administrator.

4. The network infrastructure device of claim 3, wherein the intent provided by the network administrator includes an intent to connect network sites to which one or more of the set of network infrastructure devices are associated.

5. The network infrastructure device of claim 1, wherein determining the preferred path comprises identifying a destination device from a route list received from the network orchestrator, computing a least cost path from the network infrastructure device to the destination device based on the network connectivity graph, and selecting the least cost path as the preferred path.

6. The network infrastructure device of claim 5, wherein the route list includes routes to destination devices connected via tunnels to the network infrastructure device, routes to destination devices that are categorized into the same connected site as the network infrastructure device, and routes to destination devices connected via tunnels to at least one device categorized into the same connected site as the network infrastructure device.

7. The network infrastructure device of claim 1, wherein the network infrastructure device is a virtual private network concentrator (VPNC).

8. A method, comprising:
   receiving, at a network orchestrator, advertisements from a set of network infrastructure devices of a software defined wide area network (SD-WAN), each advertisement including information about SD-WAN overlay tunnels terminated at the respective network infrastructure device;
   identifying, based in part on the received advertisements, overlay tunnels of the SD-WAN, including type, operational status, and termination points;
   determining, based in part on the identified overlay tunnels, a set of advertisement areas of the SD-WAN, wherein each of the set of network infrastructure devices is categorized as a member of an advertisement area;
   determining, based in part on the identified overlay tunnels, a set of connected sites, wherein each of a subset of the set of network infrastructure devices are categorized into at least one of the set of connected sites;
constructing, based in part on the identified overlay tunnels, the set of advertisement areas, and the set of connected sites, a set of network connectivity graphs, each associated with a respective advertisement area of the set of advertisement areas;
constructing a first set of route lists, each route list of the first set indicating a destination device for each route from a particular network infrastructure device;
constructing a second set of route lists, each route list of the second set indicating a next hop device for each route from a particular network infrastructure device; and
transmitting network connectivity graphs to each of the set of network infrastructure devices,
  wherein the network connectivity graph transmitted to each network infrastructure device is the network connectivity graph associated with the advertisement area to which the respective network infrastructure device is a member; and
transmitting the first set and second set of route lists to respective network infrastructure devices, the first set of route lists transmitted to network infrastructure devices categorized into one of the set of connected sites and the second set of route lists transmitted to other network infrastructure devices.

9. The method of claim 8, wherein the advertisement area is a collection of network infrastructure devices between which SD-WAN overlay tunnels interconnect to form a contiguous SD-WAN overlay network.

10. The method of claim 8, wherein each of the set of connected sites is a collection of network infrastructure devices that operate collectively based on an intent provided by a network administrator.

11. The method of claim 10, wherein the intent provided by the network administrator includes an intent to connect network sites to which one or more of the set of network infrastructure devices are associated.

12. The method of claim 8, wherein the subset of network infrastructure devices categorized into one of the set of connected sites are virtual private network concentrators (VPNCs) and the other network infrastructure devices are branch gateways (BGs).

13. The method of claim 12, wherein the network connectivity graphs transmitted to BGs include routes that indicate which network infrastructure device to forward data traffic associated with the route.

14. The method of claim 12, wherein the network connectivity graphs transmitted to VPNCs includes routes that do not indicate which network infrastructure device to forward data traffic associated with the route.

15. The method of claim 12, wherein each connected site includes a plurality of VPNCs that a network administrator intends to operate collectively.

16. The method of claim 8, wherein the set of network connectivity graphs provide information about overlay tunnel connectivity between network infrastructure devices of a SD-WAN, and wherein each advertisement area is substantially interconnected by overlay tunnels but is not substantially connected to other advertisement areas by overlay tunnels.

17. A system, comprising:
a network orchestrator including a memory comprising instructions that cause the network orchestrator to:
  receive from a first VPNC, a second VPNC, a first BG, and a second BG, advertisements including information about SD-WAN overlay tunnels terminated at each respective device;
  identify, based in part on the received advertisements, overlay tunnels of the SD-WAN, including type, operational status, and termination points;
  determine, based in part on the identified overlay tunnels, a set of advertisement areas of the SD-WAN, wherein the first VPNC, the second VPNC, the first BG, and the second BG are members of a first advertisement area;
  determine, based in part on the identified overlay tunnels, a set of connected sites, wherein the first VPNC and the second VPNC are members of a first connected site;
  construct, based in part on the identified overlay tunnels, the set of advertisement areas, and the set of connected sites, a network connectivity graph for the first advertisement area;
  transmit the network connectivity graph to the first VPNC and the second VPNC with a first route list indicating a destination device for each route; and
  transmit the network connectivity graph to the first BG and the second BG with a second route list indicating a next hop device for each route; and
the first BG connected to the first VPNC via one or more overlay tunnels, the first BG including a memory comprising instructions that cause the first BG to:
  receive the network connectivity graph with the second route list from the network orchestrator;
  receive a request from a first client device to forward data traffic to a second client device connected to the second BG;
  determine, based on the network connectivity graph, that the first VPNC is selected as a next overlay hop to forward the data traffic; and
  forward the data traffic to the first VPNC;
the first VPNC including a memory comprising instructions that cause the first VPNC to:
  receive the network connectivity graph with the first route list from the network orchestrator;
  receive the request originated from the first client device to forward the data traffic to the second client device;
  determine, based on the network connectivity graph, that the second BG is an overlay destination device for the data traffic;
  determine, using a path computation algorithm, a preferred path from the first VPNC to the second BG via the second VPNC; and
  forward the data traffic along the preferred path; and
a second BG connected to the second VPNC via one or more overlay tunnels, the second BG including a memory comprising instructions that cause the second BG to:
  receive the data traffic from the second VPNC; and
  forward the data traffic to the second client device.

18. The system of claim 17, wherein the first VPNC is in a first datacenter and the second VPNC is in a second datacenter and an intent provided by a network administrator connects the first datacenter and the second datacenter as connected sites.

19. The system of claim 17, wherein the network orchestrator is a cloud service and the second client device is a cloud device.

20. The system of claim 17, wherein the network orchestrator further includes instructions to transmit an updated network connectivity graph comprising changes to the original network connectivity graph.

* * * * *